(12) United States Patent
Terçariol et al.

(10) Patent No.: US 9,141,119 B2
(45) Date of Patent: Sep. 22, 2015

(54) REDUCING OUTPUT VOLTAGE RIPPLE OF POWER SUPPLIES

(71) Applicants: Walter L. Terçariol, Campinas (BR); Richard Titov Lara Saez, Campinas (BR); Alfredo Salvarani, Itapira (BR); Remerson Stein Kickhofel, Holambra (BR)

(72) Inventors: Walter L. Terçariol, Campinas (BR); Richard Titov Lara Saez, Campinas (BR); Alfredo Salvarani, Itapira (BR); Remerson Stein Kickhofel, Holambra (BR)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 480 days.

(21) Appl. No.: 13/742,540

(22) Filed: Jan. 16, 2013

(65) Prior Publication Data
US 2014/0197807 A1    Jul. 17, 2014

(51) Int. Cl.
*G05F 1/10* (2006.01)
*G05F 3/02* (2006.01)
*G05F 1/46* (2006.01)

(52) U.S. Cl.
CPC ........................................ *G05F 1/46* (2013.01)

(58) Field of Classification Search
CPC .............. H03K 3/2893; H03K 3/3565; H03K 3/02337; H03K 3/0377; H03K 3/011
USPC .................. 327/538, 536, 540, 541, 205–206
See application file for complete search history.

(56) References Cited

U.S. PATENT DOCUMENTS

| 5,640,118 | A  | * | 6/1997 | Drouot ......................... 327/306 |
| 7,199,645 | B2 | * | 4/2007 | Chang et al. .................. 327/538 |
| 7,683,700 | B2 |   | 3/2010 | Huynh et al. |
| 7,764,525 | B2 |   | 7/2010 | Hsieh et al. |
| 8,013,666 | B1 |   | 9/2011 | Liu |

FOREIGN PATENT DOCUMENTS

| EP | 1235348 A1 | * | 8/2002 |
| JP | 2008103995 A | * | 5/2008 |

* cited by examiner

*Primary Examiner* — Quan Tra
(74) *Attorney, Agent, or Firm* — Luiz von Paumgartten; Fogarty, L.L.C.

(57) ABSTRACT

Reducing output voltage ripple of power supplies. In some embodiments, an electronic circuit may include a first node configured to receive an input signal proportional to an output voltage produced by a power supply, a second node configured to receive a reference voltage configured to alternate between two voltage values during operation of the power supply, and a third node configured to output an enabling signal configured to control the operation of the power supply in response to a comparison between the input signal and the reference voltage. In other embodiments, a method may include turning on a power supply in response to a falling ripple being smaller than a first reference voltage value, and turning off the power supply in response to a rising ripple being greater than a second reference voltage value, where the second reference voltage value is smaller than the first reference voltage value.

18 Claims, 6 Drawing Sheets

REDUCING OUTPUT VOLTAGE RIPPLE OF POWER SUPPLIES

FIELD

This disclosure relates generally to electronic devices, and, more specifically, to systems and methods for reducing the output voltage ripple of power supplies.

BACKGROUND

A "power supply" is a circuit that supplies electric energy to an electrical or electronic device. Power supplies used in modern electronic devices include, for example, batteries, Direct Current (DC) supplies, Alternating Current (AC) supplies, etc.

In some cases, a power supply may convert electric energy from one form to another. For instance, a "DC-to-DC converter" is a type of power supply capable of transforming a given DC voltage level into another (i.e., higher or lower) DC voltage level. Such a converter may be used, for example, in an electronic device that contains two or more circuits, each circuit having its own voltage requirement(s) that may be different from the voltage provided by the device's power supply.

An example of a DC-to-DC converter is the "charge pump." A charge pump may use capacitor(s) and switching circuit(s) to create a higher or lower voltage source from the same power supply. To generate a high voltage from a lower-voltage power supply, for example, a switching circuit may be configured such that a capacitor is connected across the power supply, thus allowing the voltage across the capacitor ($V_c$) to approximate the power supply's voltage ($V_{dd}$). Then, the switching circuit may assume another configuration such that the capacitor is connected in series with the power supply. As a result, the output of the charge pump is equal to the sum of the power supply's voltage and the capacitor's voltage (i.e., $V_{out}=V_{dd}+V_c \cong 2\,V_{dd}$), thus effectively doubling the supply voltage to the load (ignoring leakage and other effects).

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments disclosed herein are directed to systems and methods for reducing the output voltage ripple of power supplies. In many implementations, such systems and methods may be incorporated into a wide range of electronic devices including, for example, computer systems or Information Technology (IT) products (e.g., servers, desktops, laptops, switches, routers, etc.), telecommunications hardware, consumer devices or appliances (e.g., mobile phones, tablets, televisions, cameras, sound systems, video games, etc.), scientific instrumentation, industrial robotics, medical or laboratory electronics (e.g., imaging, diagnostic, or therapeutic equipment, etc.), transportation vehicles (e.g., automobiles, buses, trains, watercraft, aircraft, etc.), military equipment, etc. More generally, the circuits discussed herein may be incorporated into any electronic device or system having one or more power supplies.

Figure 1:
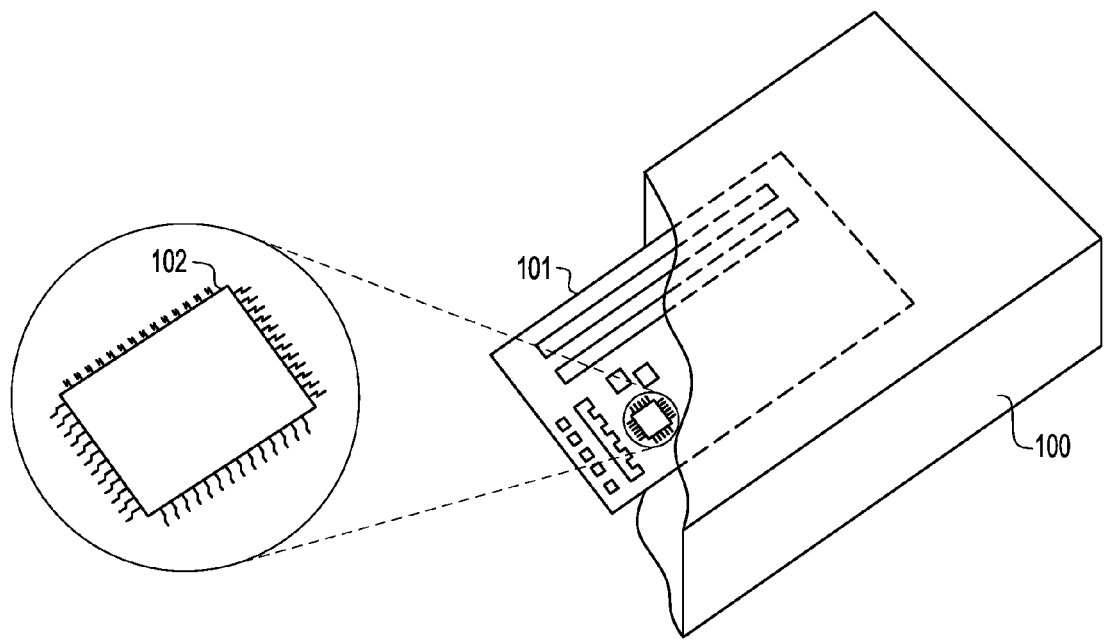
FIG. 1 is a diagram of an example of an electronic device comprising one or more integrated circuits according to some embodiments.

Turning to FIG. 1, a block diagram of electronic device 100 is depicted. In some embodiments, electronic device 100 may be any of the aforementioned electronic devices, or any other electronic device. Electronic device 100 may include one or more Printed Circuit Boards (PCBs) 101, and at least one of PCBs 101 may include one or more electronic chip(s) or integrated circuit(s) 102. In some cases, integrated circuit(s) 102 may implement various systems and methods for reducing the output voltage ripple of power supplies, as described in more detail below.

As illustrated, integrated circuit(s) 102 may be disposed within an electronic component package configured to be mounted onto PCB 101 using any suitable packaging technology such as, for example, Ball Grid Array (BGA) packaging or the like. In some applications, PCB 101 may be mechanically mounted within or fastened onto electronic device 100. In different implementations, PCB 101 may take a variety of forms and/or may include a plurality of other elements or components in addition to integrated circuit(s) 102.

Examples of integrated circuit(s) 102 may include, for instance, a System-On-Chip (SoC), an Application Specific Integrated Circuit (ASIC), a Digital Signal Processor (DSP), a Field-Programmable Gate Array (FPGA), a processor, a microprocessor, a controller, a microcontroller (MCU), or the like. Additionally or alternatively, integrated circuit(s) 102 may include a memory circuit or device such as, for example, a Random Access Memory (RAM), a Static RAM (SRAM), a Magnetoresistive RAM (MRAM), a Nonvolatile RAM (NVRAM, such as "FLASH" memory, etc.), and/or a Dynamic RAM (DRAM) such as Synchronous DRAM (SDRAM), a Double Data Rate (e.g., DDR, DDR2, DDR3, etc.) RAM, an Erasable Programmable ROM (EPROM), an Electrically Erasable Programmable ROM (EEPROM), etc.

Additionally or alternatively, integrated circuit(s) 102 may include one or more mixed-signal or analog circuits, such as, for example, Analog-to-Digital Converter (ADCs), Digital-to-Analog Converter (DACs), Phased Locked Loop (PLLs), oscillators, filters, amplifiers, transformers, etc. Additionally or alternatively, integrated circuit(s) 102 may include one or more Micro-ElectroMechanical Systems (MEMS), Nano-ElectroMechanical Systems (NEMS), or the like. As such, integrated circuit(s) 102 may include a number of different portions, areas, or regions. These various portions may include one or more processing cores, cache memories, internal bus(es), timing units, controllers, analog sections, electromechanical elements, etc.

In various embodiments, integrated circuit(s) 102 may also include or otherwise be operably coupled to one or more power supplies. Examples of power supplies may include batteries, Direct Current (DC) supplies, Alternating Current (AC) supplies, DC-to-DC converters (e.g., charge pump regulators, etc.), AC-to-DC converters (e.g., rectifiers, etc.), or the like. Although some of the examples discussed further below may be particularly well suited for charge pump regulator applications, it should be noted that those examples are provided for sake of illustration only. More generally, the systems and methods described herein may be used in connection with any other type of DC power supply, or any other type of power supply.

Figure 2:
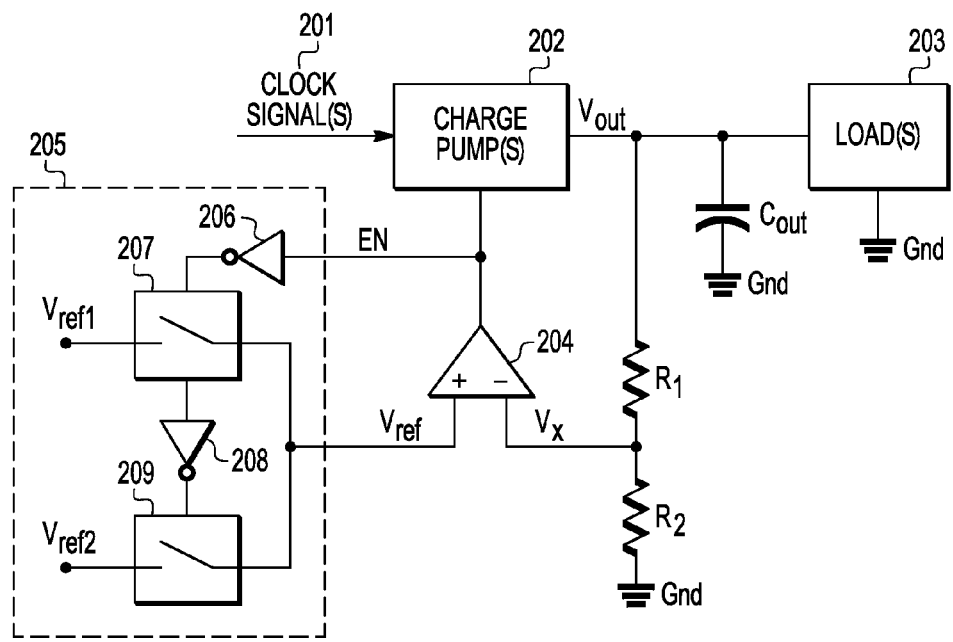
FIG. 2 is a circuit diagram of an example of a charge pump regulator with a modulated reference voltage circuit according to some embodiments.

FIG. 2 is a circuit diagram of an example of charge pump regulator 200 with modulated reference voltage circuit 205 according to some embodiments. In some cases, charge pump regulator 200 may be used with a memory device (e.g., EEPROM, flash memory, etc.) or the like. As shown, charge pump(s) 202 receive clock signal(s) 201 and provide an output voltage ($V_{out}$) to load(s) 203. Typically, charge pump(s) 202 operate in two or more stages under control of clock signal(s) 201 in order to generate $V_{out}$. For example, in a first stage, elements within charge pump(s) 202 may be configured in a first manner, and, in a second stage, those elements may be configured in a different manner. These different configurations allow charge pump(s) 202 to convert a given DC voltage value into a different DC voltage value.

In this example, the feedback path includes resistors $R_1$ and $R_2$, which operate to reduce $V_{out}$ into a proportionally smaller voltage ($V_x$) such that:

$$V_x = \left(\frac{R2}{R1+R2}\right) \cdot V_{out}.$$

A reference voltage ($V_{ref}$) is then provided to a non-inverting node of comparator 204, while $V_x$ is provided to an inverting node of comparator 204. In some cases, a bandgap voltage reference circuit or the like may provide $V_{ref}$ and/or other reference voltage values.

In operation, when $V_{ref}$ is greater than $V_x$, the output node of comparator 204 outputs an enabling signal (EN) with a high logic value (EN=1), which allows charge pump(s) 202 to operate. When $V_x$ is greater than $V_{ref}$, however, the output of comparator 204 assumes a low logic value (EN=0), which causes charge pump(s) 202 to turn off. At that point, $V_{out}$ begins to drop until $V_{ref}$ is again greater than $V_x$, when EN assumes a high logic value (EN=1) and charge pump(s) 202 are turned back on. The cycle then repeats itself in an alternating manner.

Incidentally, there is an intrinsic delay $\Delta T$ in the feedback path between the time when $V_{ref}$ actually becomes greater than $V_x$ (and vice versa) and the time when comparator 204 is able to complete its operation(s) and switch the value of EN. Because of that delay, $V_{out}$ exhibits a ripple, which is generally undesirable. Hence, in order to smoothen the otherwise pulsing nature of $V_{out}$, an output capacitor ($C_{out}$) may be provided. To be effective in reducing the output voltage ripple of $V_{out}$, however, $C_{out}$ needs to have a large capacitance value, thus occupying a large area on the chip.

To address the foregoing, and other concerns, modulated reference voltage circuit 205 of FIG. 2 may enable a reduction of the output voltage ripple of $V_{out}$ independently of the presence or physical size of $C_{out}$. For example, in some cases, modulated reference voltage circuit 205 may allow $C_{out}$ to be reduced in size while maintaining the same output voltage ripple. In other cases, modulated reference voltage circuit 205 may decrease the output voltage ripple for a given size of $C_{out}$.

In some embodiments, modulated reference voltage circuit 205 may dynamically change the value of $V_{ref}$ between two different reference voltage values: a high voltage value ($V_{ref1}$) and a low voltage value ($V_{ref2}$). These two different voltage values may be selected to compensate at least in part for the intrinsic delay $\Delta T$ of the feedback circuitry controlling the operation of charge pump(s) 202.

Particularly, through operation of inverters 206 and 208, when EN has a high logic value (EN=1), switch 207 is open, switch 209 is closed, and $V_{ref}$ assumes the value of $V_{ref2}$. When EN has a low logic value (EN=0), switch 207 is closed, switch 209 is open, and $V_{ref}$ assumes the value of $V_{ref1}$. In other words, when charge pump(s) 202 are tuned on and $V_{out}$ is rising, $V_x$ is compared against low reference voltage $V_{ref2}$. When charge pump(s) 202 are tuned off and $V_{out}$ is falling, $V_x$ is compared against high reference voltage $V_{ref1}$.

As such, the use of two reference voltages $V_{ref1}$ and $V_{ref2}$ allows EN to switch between logic states earlier in time than if a single reference voltage were used. In some embodiments, the use of two different reference voltages may compensate, at least in part, for the intrinsic delay $\Delta T$ involved in the comparison of $V_{ref}$ against $V_x$.

Figure 3:
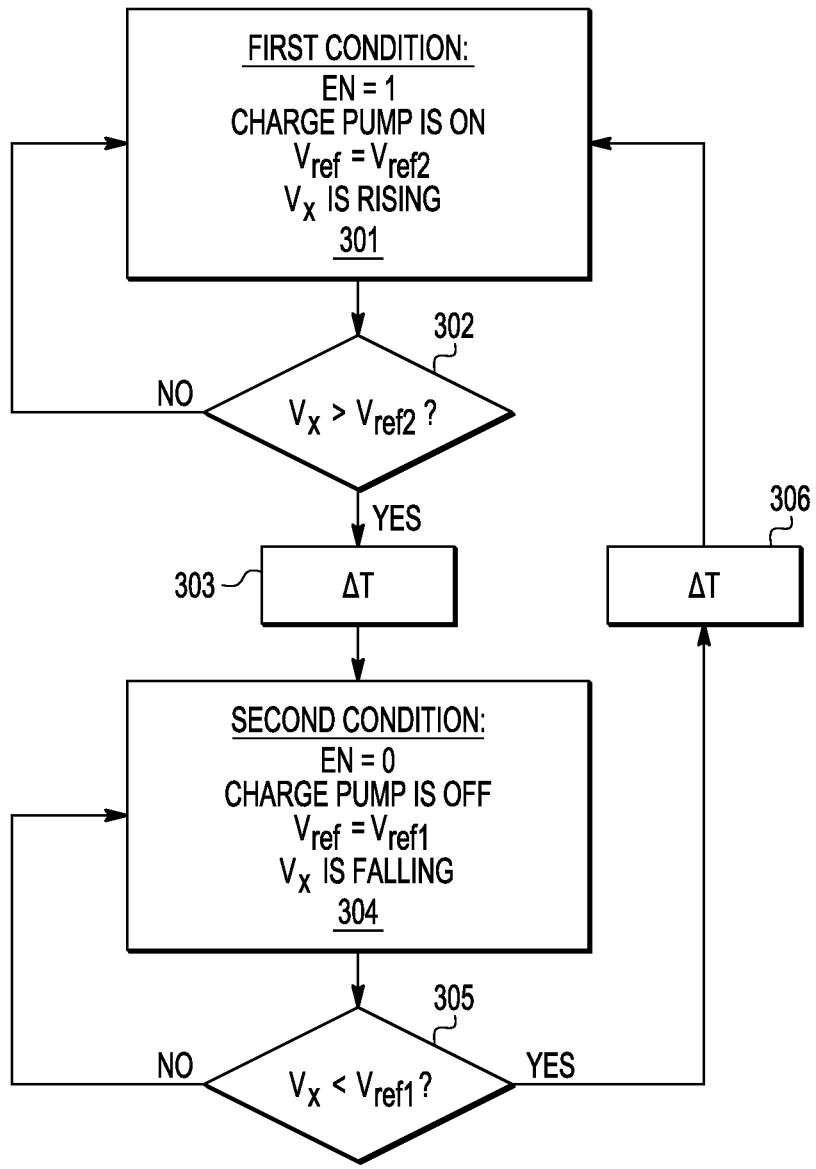
FIG. 3 is a flowchart of an example of a method of reducing output voltage ripple of a charge pump regulator according to some embodiments.

FIG. 3 depicts a flowchart of an example of method 300 of reducing output voltage ripple of charge pump regulator 200. At block 301, a first condition takes place where EN is asserted (EN=1) and charge pump(s) 202 are turned on. In this case, $V_x$ is rising and $V_{ref}$ assumes the value of $V_{ref2}$. At block 302, a determination is made (e.g., via comparator 204) of whether $V_x$ is greater than $V_{ref2}$. The intrinsic delay $\Delta T$ presented by the feedback path is illustrated by block 303. If $V_{ref2} > V_x$, control returns to block 301. Otherwise, method 300 enters a second condition at block 304 where EN is de-asserted (EN=0) and charge pump(s) 202 are turned off. Here, $V_x$ is falling and $V_{ref}$ assumes the value of $V_{ref1}$. Then, at block 305, a determination is made (e.g., via comparator 204) of whether $V_x$ is smaller than $V_{ref1}$. Again, the intrinsic delay $\Delta T$ of the feedback path is shown by block 306. If $V_{ref1} > V_x$, control returns to block 303. Otherwise, control returns to block 301, where the first condition is reestablished.

Figure 4:
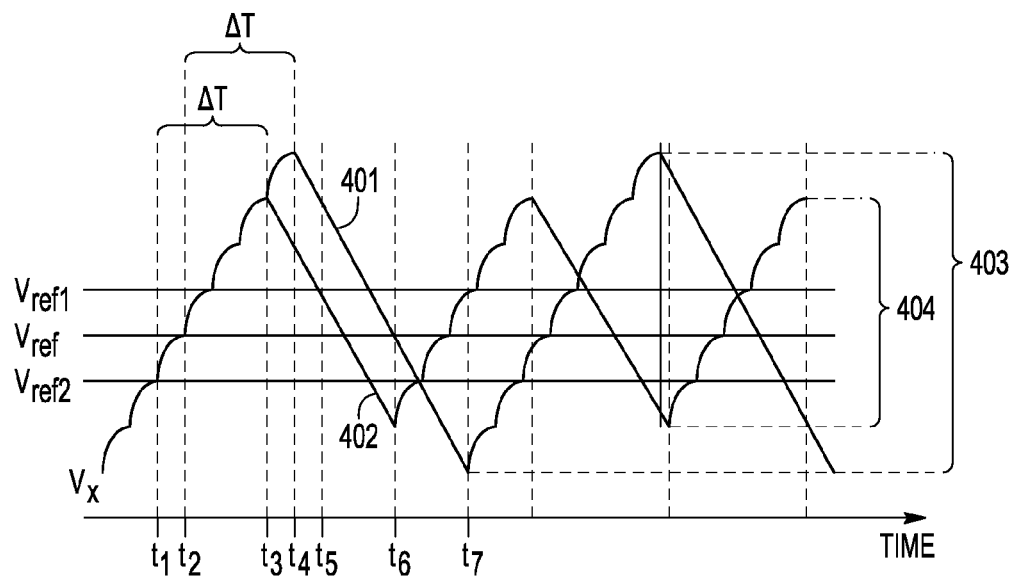
FIG. 4 shows graphs illustrating operation(s) of a charge pump regulator with a modulated reference voltage circuit according to some embodiments.
Figure 5:
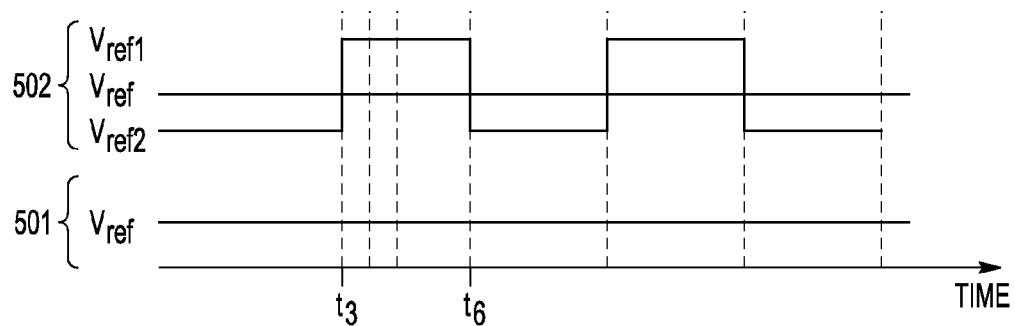
FIG. 5 shows graphs illustrating operation(s) of a modulated reference voltage circuit according to some embodiments.
Figure 6:
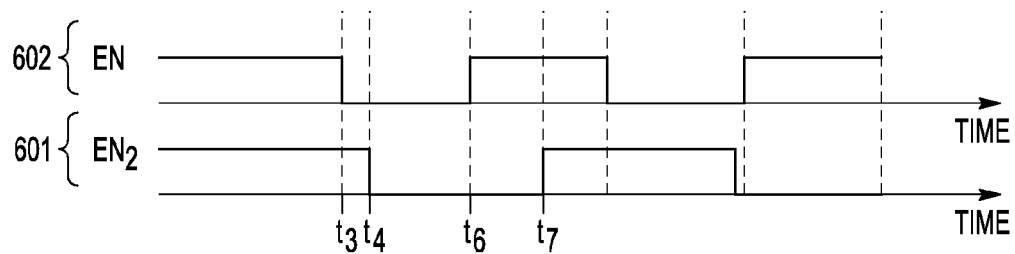
FIG. 6 shows graphs illustrating operation(s) of an enabling signal according to some embodiments.

To help explain some of the foregoing techniques, FIGS. 4-6 show various graphs comparing the techniques where two alternating reference voltage values ($V_{ref1}$ and $V_{ref2}$) are used against traditional techniques where a single, fixed reference voltage value $$V_{ref} = \left(\frac{V_{ref1} + V_{ref2}}{2}\right)$$

is used.

Specifically, curve 401 represents the output of charge pump regulator 200 without modulated reference voltage circuit 205, such that the input to comparator 204 is a fixed $V_{ref}$, shown in graph 501. In this case, at a time prior to $t_2$, $V_x$ is rising and a corresponding enabling signal EN2 is asserted (EN2=1), shown in graph 601. When $t=t_2$, $V_x$ becomes greater than $V_{ref}$ and, EN2 should ideally be immediately de-asserted so that charge pump(s) 202 are turned off and $V_{out}$ (and consequently $V_x$) begin to fall. Due to the intrinsic delay $\Delta T$ of the feedback path, however, the actual determination that $V_x$ is greater than $V_{ref}$ is not completed, and EN2 is not de-asserted (EN2=0), until $t_4=t_2+\Delta T$.

During the falling portion of graph 401, the reverse situation occurs. Now $V_x$ is falling and enabling signal EN2 is de-asserted (EN2=0). When $t=t_6$, $V_x$ becomes smaller than $V_{ref}$ and EN2 should be asserted so that charge pump(s) 202 are turned on and $V_{01}$ (and consequently $V_x$) begin to rise. But again, due to the intrinsic delay $\Delta T$ of the feedback path, EN2 is not asserted (EN2=1) until $t_7=t_6+\Delta T$. As a result, the output voltage ripple is shown as 403. It should be noted that ripple 403 is shown in terms of $V_x$, and that it is directly proportional to the power supply output voltage ripple observed in $V_{out}$.

The foregoing results are in contrast with the techniques discussed in FIGS. 2 and 3, the results of which are shown in graph 402. Particularly, curve 402 represents $V_x$ when modulated reference voltage circuit 205 provides two distinct reference voltage values $V_{ref1}$ and $V_{ref2}$ to comparator 204. In this case, immediately prior to $t=t_1$, $V_x$ is rising. As such, the first condition of block 301 of FIG. 3 is established such that $V_{ref2}$ is selected (shown in graph 502) and EN is asserted (EN=1; shown in graph 602). At $t=t_1$, $V_x$ becomes greater than $V_{ref2}$ (block 302 of FIG. 3), and the second condition of block 304 is instituted.

As previously noted, however, the comparison or determination of block 302 also suffers from the same intrinsic delay $\Delta T$ of the feedback path (block 303), therefore EN is not de-asserted, charge pump(s) 202 do not turn off, and $V_x$ does not begin falling until $t_3=t_1+\Delta T$. Nonetheless, it should be noted that $t_3<t_4$; that is, EN 602 switches to a logic low sooner than EN2 601. As such, curve 402 begins to fall before curve 401 does.

When $V_x$ begins to fall at $t=t_3$, the second condition of block 304 in FIG. 3 controls such that EN is de-asserted (EN=0), charge pump(s) 202 are turned off, and $V_{ref}$ assumes the value of $V_{ref1}$. At $t=t_5$, $V_x$ becomes smaller than $V_{ref1}$ (block 304 of FIG. 3), and method 300 returns to block 301. Again, the comparison or determination of block 305 suffers from the intrinsic delay $\Delta T$ of the feedback path (block 306), hence EN is not asserted, charge pump(s) 202 does not turn on, and $V_x$ does not begin rising until $t_6=t_5+\Delta T$. Again, however, it should be noted that $t_6<t_7$; that is, EN 602 switches to a logic high sooner than EN2 601. As such, curve 402 begins to rise before curve 401 does. And, as a result, the output voltage ripple of $V_x$ (which is proportional to the ripple of $V_{out}$) is shown as 404, which is smaller than 403.

Accordingly, the output voltage ripple of charge pump regulator 200 may be reduced by dynamically modulating the value of the reference voltage (e.g., between two values $V_{ref1}$ and $V_{ref2}$) used by comparator 204. The selection of different reference voltage values during the rising and falling parts of the output voltage curve allows the comparison between $V_x$ and $V_{ref1}$ or $V_{ref2}$ to be made in ahead of time with respect to an otherwise fixed $V_{ref}$, thus allowing the circuit to correct and/or compensate, at least in part, for the intrinsic delay $\Delta T$ of the feedback path.

In various embodiments, values of $V_{ref1}$ and $V_{ref2}$ may be determined during design of charge pump regulator 200 using computer-based circuit simulations or the like. Additionally or alternatively, values of $V_{ref1}$ and $V_{ref2}$ may be determined after manufacturing using one or more of the circuits discussed in FIGS. 7-9. For example, prior to block 301 in the method of FIG. 3, a setup procedure may be performed where an initial $V_{ref}$ is used by comparator 204 until a ripple detection circuit and a decoder circuit (as shown in FIG. 8) are able to determine a $\Delta V$ value such that $V_{ref1}=V_{ref}+\Delta V$ and $V_{ref2}=V_{ref}-\Delta V$. Once $\Delta V$ is determined, a reference voltage selection circuit (shown in FIG. 7) may provide $V_{ref1}$ and/or $V_{ref2}$ to comparator 204 under control of enabling signal EN.

Figure 7:
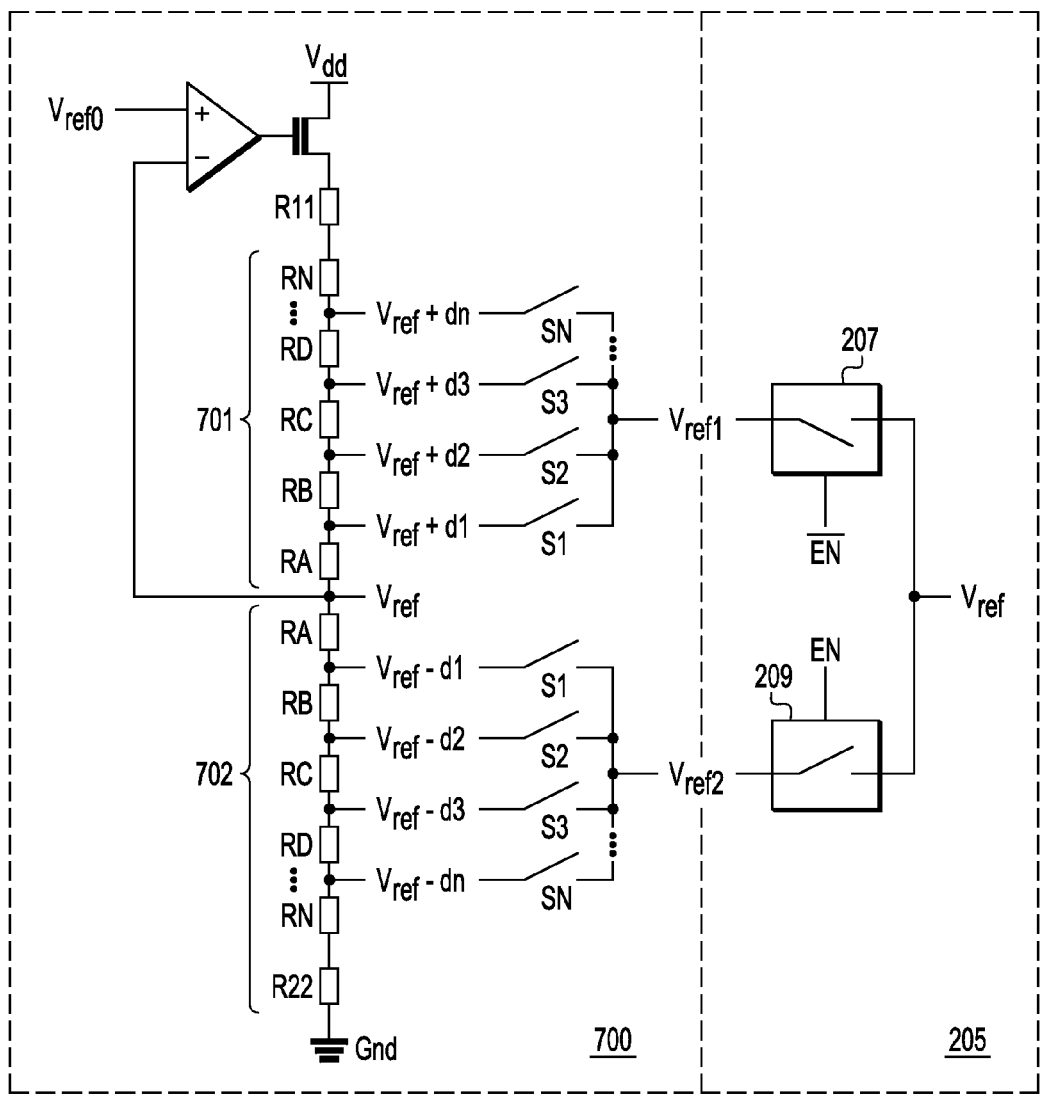
FIG. 7 is a circuit diagram of an example of a reference voltage selection circuit according to some embodiments.
Figure 8:
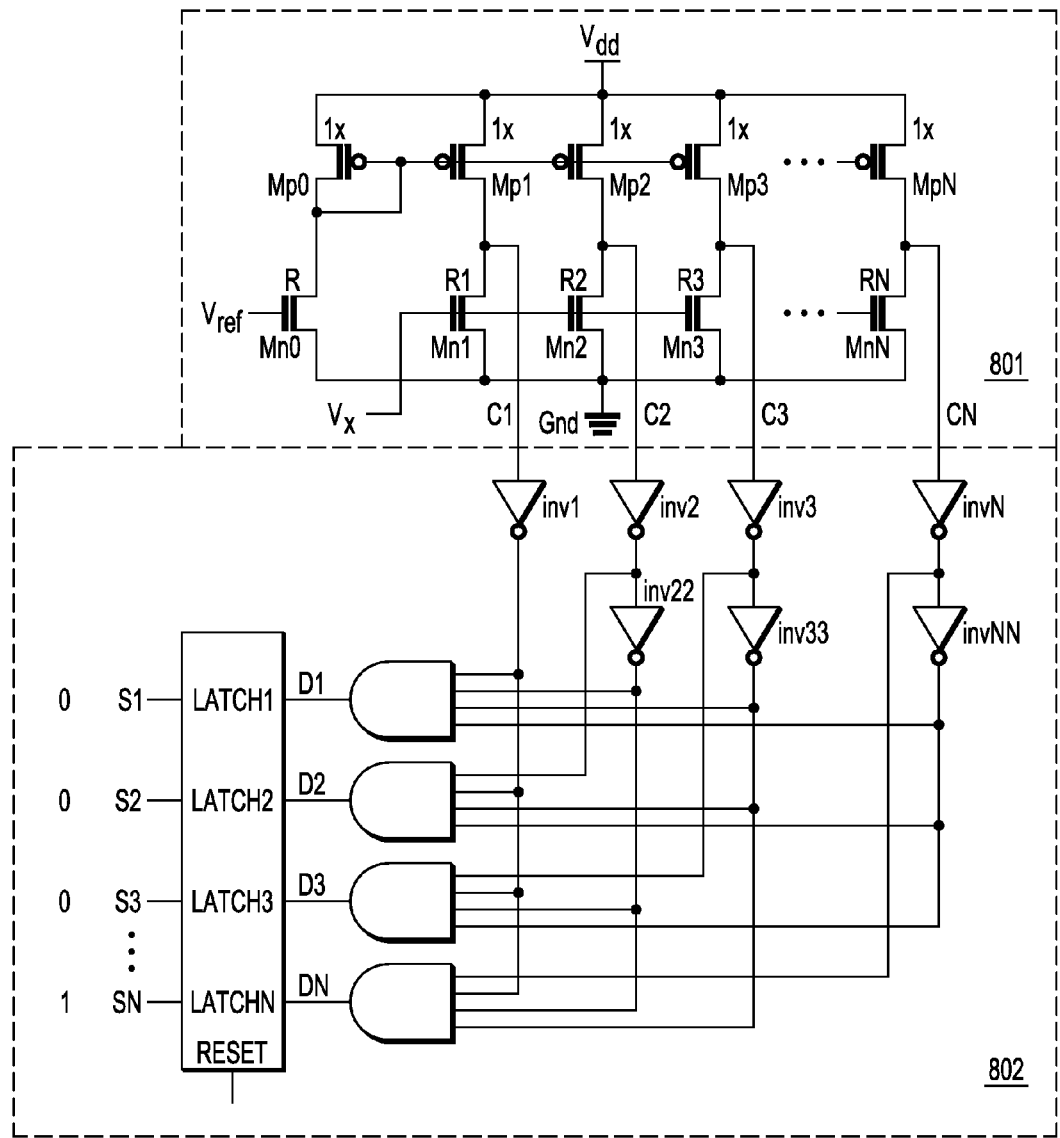
FIG. 8 is a circuit diagram of an example of a ripple detection circuit and a decoder circuit according to some embodiments.

FIG. 7 is a circuit diagram of an example of reference voltage selection circuit 700. In some embodiments, reference voltage selection circuit 700 may receive a reference voltage ($V_{ref0}$) and may provide $V_{ref1}$ and $V_{ref2}$ to switches 207 and 209 of modulated reference voltage circuit 205. The granularity of upper and lower portions 701 and 702 is depicted as resistors RA, RB, RC, . . . , RN (RA-N). Switches S1, S2, S3, . . . , SN (S1-N) may be controlled by logic control circuitry 802 of FIG. 8 as discussed below.

Generally speaking, each corresponding one of switches S1-SN may be turned on or off depending upon the magnitude of the output voltage ripple detected by sensing circuitry 801, also shown in FIG. 8. As such, switches S1-N may select a suitable number of resistors RA-N and thus a suitable value of $\Delta V$ that is used to generate $V_{ref1}$ and $V_{ref2}$ such that $V_{ref1}=V_{ref}+\Delta V$ and $V_{ref2}=V_{ref}-\Delta V$. As an implementation example, each of resistors RA-N may provide uniform increase (in portion 701) or decrease (in portion 702) of 1% of $V_{ref0}$. In other implementation, however, other values may be used.

FIG. 8 is a circuit diagram of an example of ripple detection circuit 801 and decoder circuit 802. In some embodiments, ripple detection circuit 801 may operate as a current comparator, and each of transistors Mn1, Mn2, . . . , MnN may be dimensioned to be, for example, 1% of $V_{ref}$. Meanwhile, Mn devices may be dimensioned to be 1% higher than Mp devices, with Mn1 having a lowest weight and MnN having a highest weight. In operation, S1 detects (and is also latched) when the output voltage ripple is greater than the lower 1% of $V_{ref}$. Gradually, subsequent switches S2, . . . , SN are selected and turned on independently as the output voltage ripple increases. To this end, decoder circuit 802 includes a plurality of inverters and a plurality of AND logic circuits coupled to a respective latch circuit (latch 1, latch 2, . . . , latch N). FIG. 8 also shows that, in this case, switch SN (also shown in FIG. 7) is closed and all other switches are open, and therefore switch SN corresponds to the peak of the output voltage ripple (of $V_x$) detected by ripple detection circuit 801.

Figure 9:
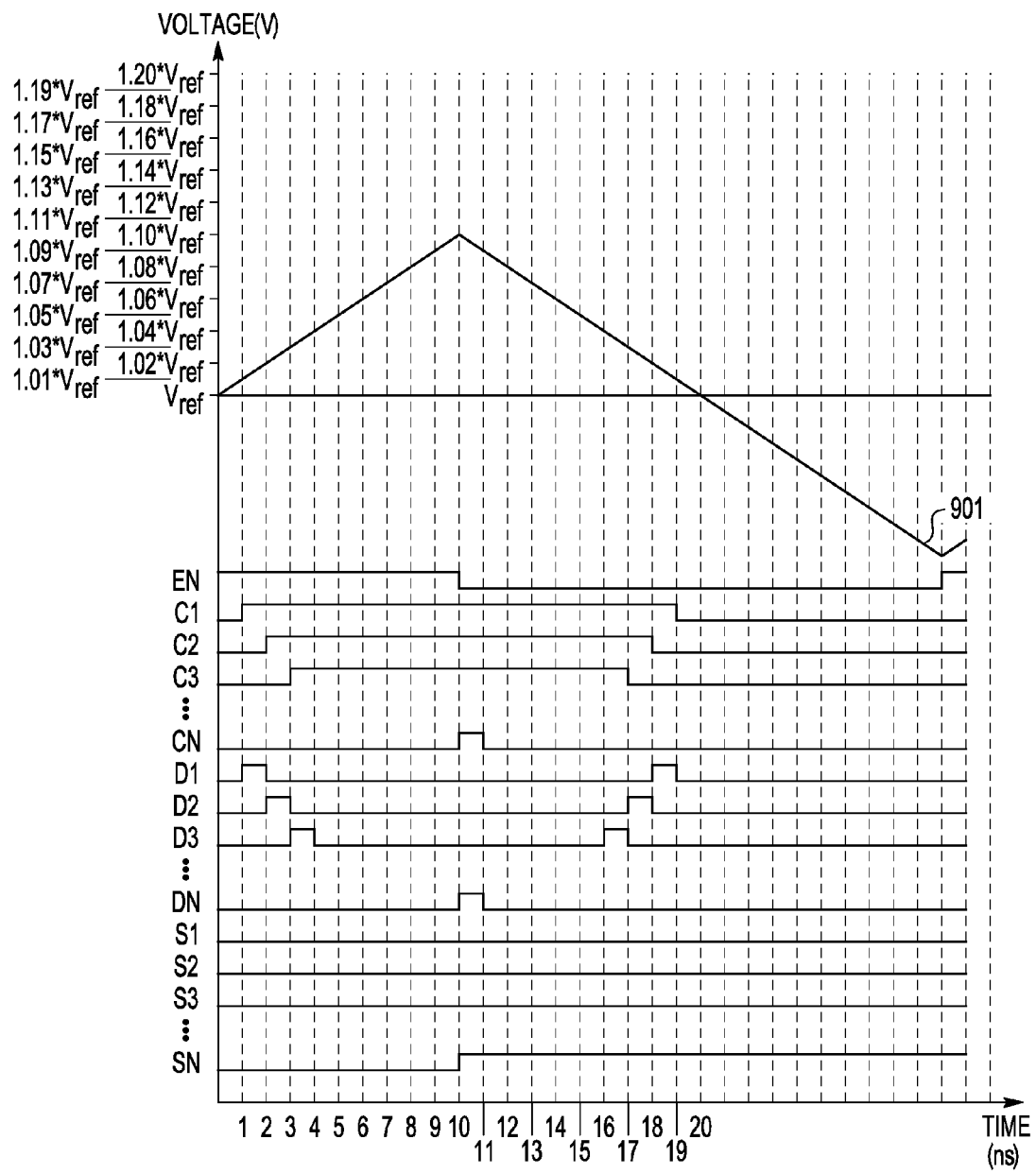
FIG. 9 is a graph illustrating operation(s) of a ripple detection circuit and a decoder circuit according to some embodiments.

FIG. 9 is a graph illustrating operation of ripple detection circuit 801 and decoder circuit 802 according to some embodiments. In this example, curve 901 shows $V_x$ exhibiting a ripple around the value of $V_{ref}$. During the rising ripple portion of $V_x$ (t=0 to 10 ns), the enabling signal EN is asserted (EN=1), and, during the falling ripple portion of $V_x$ (t=10 to 20 ns), EN is de-asserted (EN=0).

Signals C1-CN show that ripple detection circuit 801 detects the peak of curve 901, in this case, with a value of 110% of $V_{ref}$ (i.e., $\Delta V=5\%$ of $V_{ref}$) at t=10 ns. The latches of decoder circuit 802 store decoded signals D1-DN, which are subsequently applied to switches S1-SN in reference voltage selection circuit 700 of FIG. 7. In this case, switch SN is closed and all other switches are open. As a result, in this example, reference voltage selection circuit 700 produces $V_{ref1}$ and $V_{ref2}$ values that are equal to 105% and 95% of $V_{ref}$, respectively.

Accordingly, the various embodiments described herein illustrate systems and methods for reducing the output voltage ripple of power supplies. In an illustrative, non-limiting embodiment, an electronic circuit may include a first node configured to receive an input signal proportional to an output voltage produced by a power supply, a second node configured to receive a reference voltage, the reference voltage configured to alternate between two voltage values during operation of the power supply, and a third node configured to output an enabling signal configured to control the operation of the power supply in response to a comparison between the input signal and the reference voltage. For example, the power supply may be a charge pump.

In some implementations the enabling signal may be configured to turn the power supply on in response to the input signal being smaller than the reference voltage. In this case, the two voltage values may include a low voltage value and a high voltage value, and the reference voltage may be equal to the low voltage value in the presence of a rising ripple in the input signal. Additionally or alternatively, the enabling signal may be configured to turn the power supply off in response to the input signal being greater than the reference voltage. In this case, the two voltage values may include a low voltage value and a high voltage value, and the reference voltage may be equal to the high voltage value in the presence of a falling ripple in the input signal. Moreover, the reference voltage being configured to alternate between two voltage values offsets a delay involved in the comparison.

In another illustrative, non-limiting embodiment, a method may include detecting a falling ripple in an output voltage produced by a power supply, turning on the power supply in response to the falling ripple being smaller than a first reference voltage value, detecting a rising ripple in the output voltage produced by the power supply, and turning off the power supply in response to the rising ripple being greater than a second reference voltage value, where the second reference voltage value is smaller than the first reference voltage value. For example, the first reference voltage value may be selected to compensate at least in part for a delay that would otherwise have resulted from a comparison between the falling ripple and an average reference voltage value between the first and second reference voltage values, and the first reference voltage value may cause the power supply to be turned on earlier than if the average reference voltage value had been used. Additionally or alternatively, the second voltage value may be selected to compensate at least in part for a delay that would otherwise have resulted from a comparison between the rising ripple and an average reference voltage value between the first and second reference voltage values, and the second reference voltage value may cause the power supply to be turned off earlier than if the average reference voltage value had been used.

In yet another illustrative, non-limiting embodiment, an electronic device may include charge pump circuitry configured to provide an output voltage, reference circuitry configured to provide a reference voltage value, the reference voltage value alternating between a low voltage value and a high voltage value, and feedback circuitry having: (a) a first input configured to receive an input signal proportional to the output voltage, (b) a second input configured to receive the reference voltage value, and (c) an output configured to provide an enabling signal to the charge pump circuitry, the value of the enabling signal depending upon a result of a comparison between the input signal and the reference voltage value.

For example, the value of the enabling signal may turn on the charge pump circuitry in response to the input signal being smaller than the selected reference voltage, and the reference voltage value may be equal to the low voltage value in the presence of a rising ripple in the input signal. Additionally or alternatively, the value of the enabling signal may turn off the charge pump circuitry in response to the input signal being greater than the reference voltage value, and the reference voltage value may be equal to the high voltage value in the presence of a falling ripple in the input signal, the falling ripple following the rising ripple.

In some implementations, the electronic device may also include control circuitry configured to receive the input signal and to detect a magnitude of a ripple in the input signal. Further, the reference circuitry may include a plurality of switches configured to select a magnitude of the low and high voltage values based upon the magnitude of the ripple.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:
1. An electronic circuit, comprising:
a first node configured to receive an input signal proportional to an output voltage produced by a power supply;
a second node configured to receive a reference voltage, the reference voltage configured to alternate between two voltage values during operation of the power supply; and
a third node configured to output an enabling signal configured to control the operation of the power supply in response to a comparison between the input signal and the reference voltage, wherein the enabling signal is configured to turn the power supply on in response to the input signal being smaller than the reference voltage, wherein the two voltage values include a low voltage value and a high voltage value, and wherein the reference voltage is equal to the low voltage value in the presence of a rising ripple in the input signal.
2. The electronic circuit of claim 1, wherein the power supply is a charge pump.
3. The electronic circuit of claim 1, wherein the enabling signal is configured to turn the power supply off in response to the input signal being greater than the reference voltage.
4. The electronic circuit of claim 3, wherein the two voltage values include a low voltage value and a high voltage value, and wherein the reference voltage is equal to the high voltage value in the presence of a falling ripple in the input signal.

5. The electronic circuit of claim 1, wherein the reference voltage being configured to alternate between two voltage values offsets a delay involved in the comparison.

6. A method, comprising:
 detecting a falling ripple in an output voltage produced by a power supply;
 turning on the power supply in response to the falling ripple being smaller than a first reference voltage value;
 detecting a rising ripple in the output voltage produced by the power supply; and
 turning off the power supply in response to the rising ripple being greater than a second reference voltage value, wherein the second reference voltage value is smaller than the first reference voltage value, wherein the first reference voltage value is selected to compensate at least in part for a delay that would otherwise have resulted from a comparison between the falling ripple and an average reference voltage value between the first and second reference voltage values.

7. The method of claim 6, wherein the power supply is a charge pump.

8. The method of claim 6, wherein the first reference voltage value causes the power supply to be turned on earlier than if the average reference voltage value had been used.

9. The method of claim 6, wherein the second voltage value is selected to compensate at least in part for a delay that would otherwise have resulted from a comparison between the rising ripple and an average reference voltage value between the first and second reference voltage values.

10. The method of claim 9, wherein the second reference voltage value causes the power supply to be turned off earlier than if the average reference voltage value had been used.

11. An electronic device, comprising:
 charge pump circuitry configured to provide an output voltage;
 reference circuitry configured to provide a reference voltage value, the reference voltage value alternating between a low voltage value and a high voltage value; and
 feedback circuitry having: (a) a first input configured to receive an input signal proportional to the output voltage, (b) a second input configured to receive the reference voltage value, and (c) an output configured to provide an enabling signal to the charge pump circuitry, the value of the enabling signal depending upon a result of a comparison between the input signal and the reference voltage value, wherein the value of the enabling signal turns on the charge pump circuitry in response to the input signal being smaller than the selected reference voltage, and wherein the reference voltage value is equal to the low voltage value in the presence of a rising ripple in the input signal.

12. The electronic device of claim 11, wherein the value of the enabling signal turns off the charge pump circuitry in response to the input signal being greater than the reference voltage value.

13. The electronic device of claim 12, wherein the reference voltage value is equal to the high voltage value in the presence of a falling ripple in the input signal, the falling ripple following the rising ripple.

14. The electronic device of claim 11, further comprising control circuitry configured to receive the input signal and to detect a magnitude of a ripple in the input signal.

15. The electronic device of claim 14, the reference circuitry comprising a plurality of switches configured to select a magnitude of the low and high voltage values based upon the magnitude of the ripple.

16. An electronic circuit, comprising:
 a first node configured to receive an input signal proportional to an output voltage produced by a power supply;
 a second node configured to receive a reference voltage, the reference voltage configured to alternate between two voltage values during operation of the power supply; and
 a third node configured to output an enabling signal configured to control the operation of the power supply in response to a comparison between the input signal and the reference voltage, wherein the enabling signal is configured to turn the power supply off in response to the input signal being greater than the reference voltage, wherein the two voltage values include a low voltage value and a high voltage value, and wherein the reference voltage is equal to the high voltage value in the presence of a falling ripple in the input signal.

17. A method, comprising:
 detecting a falling ripple in an output voltage produced by a power supply;
 turning on the power supply in response to the falling ripple being smaller than a first reference voltage value;
 detecting a rising ripple in the output voltage produced by the power supply; and
 turning off the power supply in response to the rising ripple being greater than a second reference voltage value, wherein the second reference voltage value is smaller than the first reference voltage value, wherein the second voltage value is selected to compensate at least in part for a delay that would otherwise have resulted from a comparison between the rising ripple and an average reference voltage value between the first and second reference voltage values.

18. An electronic device, comprising:
 charge pump circuitry configured to provide an output voltage;
 reference circuitry configured to provide a reference voltage value, the reference voltage value alternating between a low voltage value and a high voltage value;
 feedback circuitry having: (a) a first input configured to receive an input signal proportional to the output voltage, (b) a second input configured to receive the reference voltage value, and (c) an output configured to provide an enabling signal to the charge pump circuitry, the value of the enabling signal depending upon a result of a comparison between the input signal and the reference voltage value; and
 control circuitry configured to receive the input signal and to detect a magnitude of a ripple in the input signal, the reference circuitry comprising a plurality of switches configured to select a magnitude of the low and high voltage values based upon the magnitude of the ripple.

* * * * *